United States Patent [19]

Vykukal

[11] Patent Number: 4,594,734
[45] Date of Patent: Jun. 17, 1986

[54] SHOULDER AND HIP JOINT FOR HARD SPACE SUITS

[75] Inventor: Hubert C. Vykukal, Los Altos, Calif.

[73] Assignee: The United States of America as represented by the Administrator of the National Aeronautics and Space Administration, Washington, D.C.

[21] Appl. No.: 684,192

[22] Filed: Dec. 20, 1984

[51] Int. Cl.[4] .................... A62B 17/00; F16L 11/18
[52] U.S. Cl. ........................... 2/2.1 A; 414/7; 285/168; 138/120
[58] Field of Search .................. 2/2.1 A, 2.1 R; 128/202.11; 414/1, 5, 7, 8; 285/168, 179, 181, 182, 184, 227, 235, 177, 11, 263, 264, 261, 166; 3/12, 12.1–12.8; 138/120, 155

[56] References Cited

U.S. PATENT DOCUMENTS

| 3,405,406 | 10/1968 | Vykukal | 2/2.1 A |
|---|---|---|---|
| 3,759,550 | 9/1973 | Peress | 2/2.1 R X |
| 4,151,612 | 5/1979 | Vykukal | 2/2.1 A |
| 4,369,814 | 1/1983 | Humphrey | 2/2.1 R X |

FOREIGN PATENT DOCUMENTS 1524033  9/1978  United Kingdom ............... 138/120

OTHER PUBLICATIONS

High–Pressure Protective Systems Technology, Aerospace Div. of ASME, 9th Intersoceity Conf. on Env. Sys., San Francisco, Calif., Jul. 16–19, 1979.

Primary Examiner—Werner H. Schroeder
Assistant Examiner—Andrew M. Falik
Attorney, Agent, or Firm—Darrell G. Brekke; John R. Manning; Robert D. Marchant

[57] ABSTRACT

For use in hard space units and the like, shoulder and hip joints comprising three serially-connected truncated spherical sections, the ends of which converge. Ball bearings between the sections permit relative rotation. The proximal end of the first section is connected to the torso covering by a ball bearing and the distal end of the outermost section is connected to the elbow or thigh covering by a ball bearing. The sections are equi-angular and this alleviates lockup, the condition where the distal end of the joint leaves the plane in which the user is attempting to flex. The axes of rotation of the bearings and the bearing mid-planes are arranged to intersect in a particular manner that provides the joint with a minimum envelope. In one embodiment, the races of the bearing between the innermost section and the second section is partially within the inner race of the bearing between the torso and the innermost spherical section further to reduce bulk.

26 Claims, 9 Drawing Figures

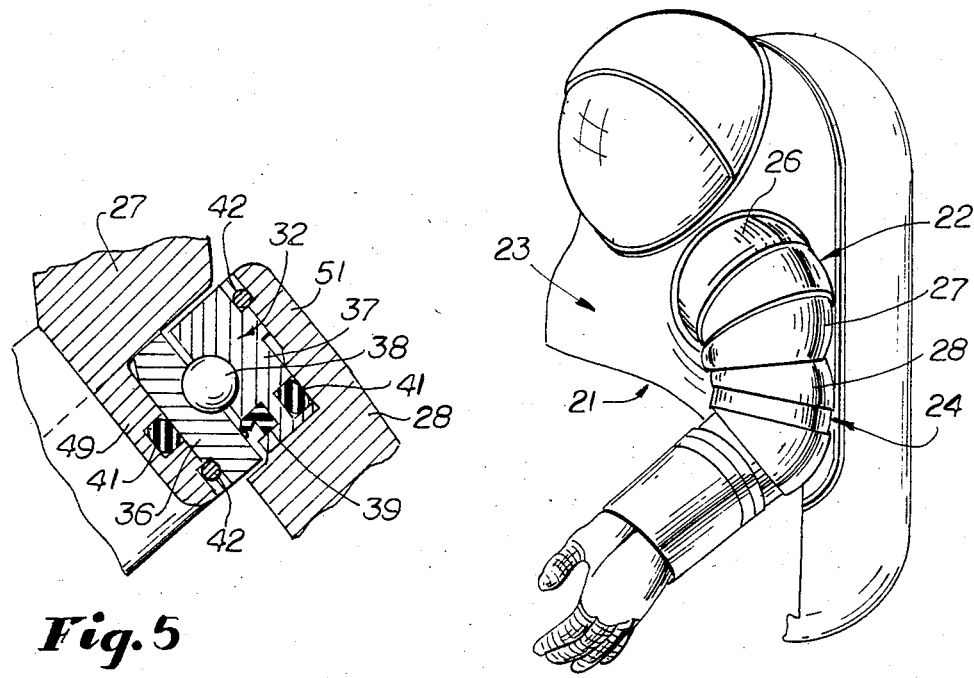
Fig. 1
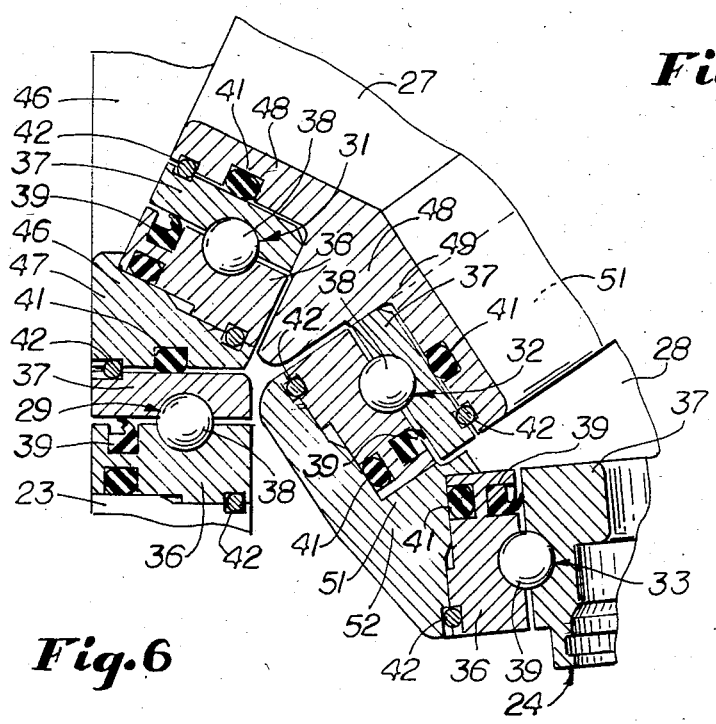
Fig. 5
Fig. 6

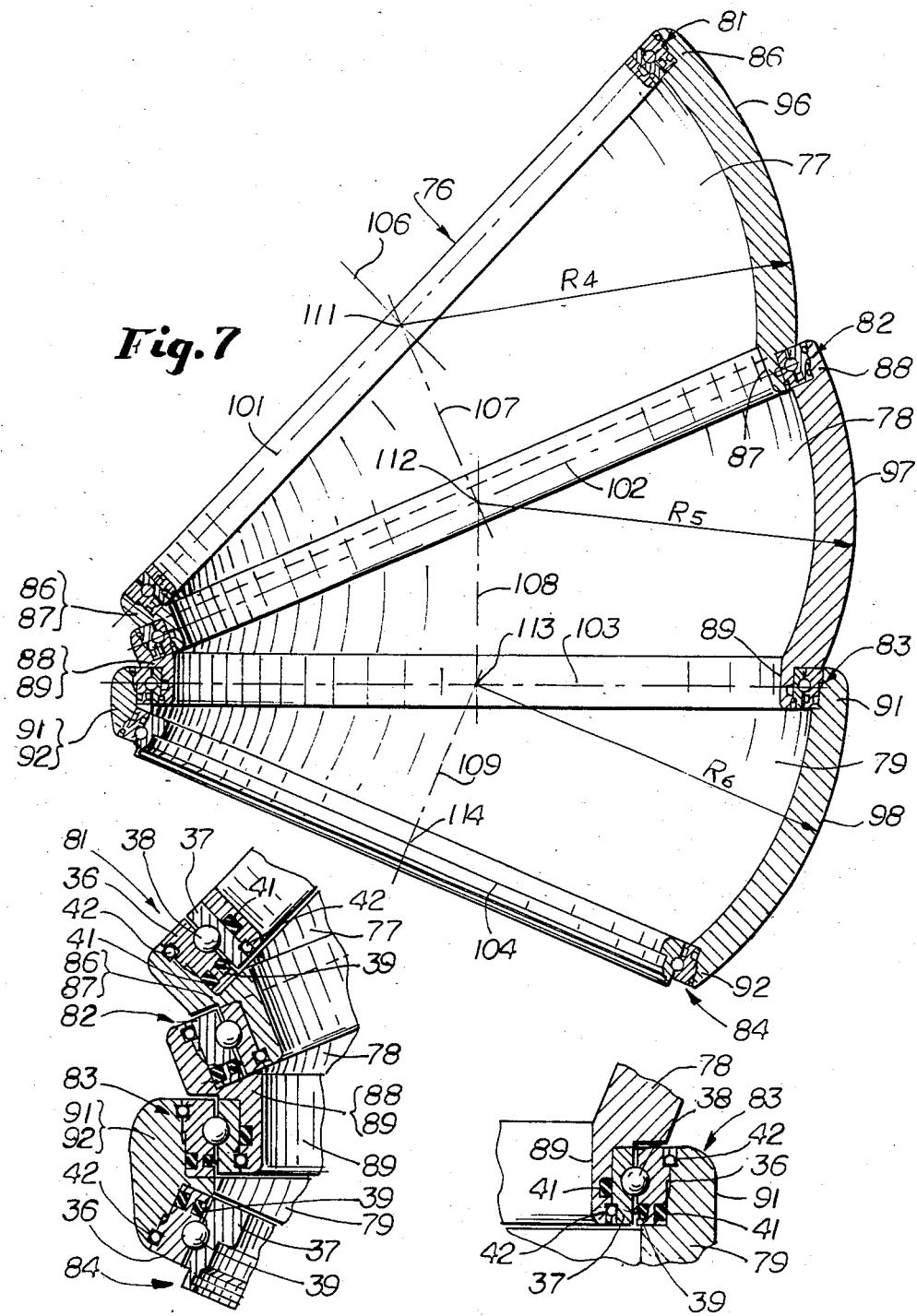

SHOULDER AND HIP JOINT FOR HARD SPACE SUITS

ORIGIN OF THE INVENTION

The invention described herein was made by an employee of the United States Government and may be manufactured and used by and for the Government for governmental purposes without the payment of any royalties thereon or therefor.

BACKGROUND OF THE INVENTION

1. Field of the Invention

This invention relates to hard space suit joints, especially for the shoulder and hip. It may also be used on diving suits, manipulator arms, user-occupied arms for penetrating boxes such as autoclaves, high vacuum boxes for integrated circuit work and the like, which require protection from hostile environments. The joint has an outer covering of a relatively rigid material in three articulated sections, each of which is a section of a sphere.

2. Description of the Prior Art

U.S. Pat. No. 3,405,406 discloses a hard space suit having a three-bearing, two-section shoulder joint and a bellows hip joint. The shoulder joint has a centrally-situated dead zone into which the centerline of the bicep bearing cannot intrude. Accordingly, the wearer of the joints of prohibited from placing his arm in a zone that coincides with an imaginary axis extending horizontally from the wearer's arm socket. The present invention permits the wearer to point his arm anywhere within a solid cone whose apex is located at the arm socket. The angle of the cone may approach 180 degrees.

U.S. Pat. No. 4,091,464 reveals a space suit which has some hard portions and some soft portions. Each leg of the suit is joined to the torso by a single ball bearing. This limits the freedom of leg motion of the wearer. The shoulder joint utilizes link-connected rings which are covered with a rolling-convolute variety diaphragm. The present invention has a plurality of independently rotatable rigid truncated spherical sections. The sections are inconnected with ball bearings and their axes of rotation are arranged in such a manner as to provide a minimal envelope for a given limb diameter and limb clearance.

U.S. Pat. No. 3,712,481 discloses a snakelike actuator for use on submarines and so forth that is motor actuated, whereas the present invention requires no motors and is actuated by movement of the limbs of the wearer. The snakelike actuator arm comprises a continuous bellows outer layer which provides a hermetic seal plus two inner layers, each of which comprises alternate cylindrical wedges and bellows. In a second embodiment the actuator arm comprises three bellows layers plus a layer of rotatable wedges. In each instance the arm is moved by means of torque motors coupled to the layers.

The paper "High-Pressure Protective Systems Technology" by Hubert C. Vykukal and Bruce W. Webbon, ASME Publication 79-ENAs-15, 1979, refers to a data supplement (last sentence before Conclusions) which has conceptual drawings of a three-section, four-bearing shoulder joint. Each section is able to rotate independently of the section adjacent thereto. The angle included between the ends of the middle section is double the included angle associated with each end section. Inasmuch as the section angles are unequal, the joint is prone to lockup, the condition where the joint will not follow a desired planar flexure of the wearer and where the centerline of the distal end bearing randomly deviates from a plane and the sections impose shear forces on the wearer that could be severe enough to be injurious. The present invention utilizes sections with equal angles and obviates lockup. The bearing centerlines in the present invention are disposed in such a manner that a minimum joint envelope results. Stated another way, for a given limb diameter and limb tunnel clearance, the joint of the present invention is optimally small. The Position A part of FIG. 11 shows that the conceptual joint does not have a minimum envelope (the limb clearance space at the first bearing is much larger than the clearance space for the smallest diameter bearing). From cost and weight standpoints, it is of course desirable to have a joint that occupies minimum volume.

OBJECT OF THE INVENTION

The present invention has for its principal object to provide a shoulder and a hip joint for use in space suits and other environments heretofore mentioned. It consists of hard, rigid plastic or metal sections, the exteriors of which comprise truncated spheres. The exteriors of the sections may be coated or otherwise made highly reflective of impinging radiation such as that from the sun.

The joint preferably comprises three sections serially connected by ball bearings which permit one section to rotate relative to adjacent sections. The ends of the joints are likewise adapted to be connected to the torso of the space suit and either to the elbow suit section or the thigh suit section also be means of ball bearings. The sections are preferably equi-angular as it has been found that this equality obviates lock-up; the condition where the joint wanders from planar motion when the wearer attempts to make a planar extension or flexion. If it were desired to have a multi-section joint with an inside tunnel clearance (inside diameter) of x centimeters (to accommodate a particular limb diameter and to allow for some space between the limb and the inside of the joint) it is apparent that no section could have an inside diameter less than x centimeters. If on the other hand only one section had an inside diameter of x centimeters and the other sections had inside diameters much larger than x centimeters, then there would be a lot of wasted clearance space between the limb and the inside of the joint and the joint would be unnecessarily voluminous and heavy. In the present invention the centerlines or axes of rotation of the bearings are arranged relative to each other in a particular manner. This arrangement of the axes of rotation of the bearings brings about a minimum envelope configuration for a selected interior tunnel clearance, that is, a selected inside diameter for the joint. Stated another way, the arrangement of the bearings gives each bearing an optimally small inside diameter for a selected tunnel clearance.

Another object of the invention is to provide a joint wherein the bearings are arranged in the axillary area area as compactly as possible. This compact arrangement of the bearing enables the joint to be incorporated in a space suit intended for a wearer of small stature. Heretofore, many joints could only accommodate users of large stature. That is, some shoulder joints occupied so much volume in the axillary area that the user of small stature could not drop the arm next to the thigh.

As hereinafter appears, in the shoulder joint which is described in detail herein, the races of one of the bearings are located within the contour of the bearing of the next proximal section, further to reduce the required space.

Preferably, each of the serially-connected sections comprises a portion of a sphere. One advantage of this shape is that it better resists pressure differentials and permits thinner walls. In preferred embodiments of the invention either the interior or the exterior of the wall of each section may be made thinner by removing material, thereby permitting insertion of a filler in the pockets formed by the material removal. Such filler may be a cosmic ray shield, a thermal insulator, etc.

A further feature of the invention is the fact that the joint does not require the use of a bellows. Bellows are not always easy to fabricate and they often have short lifespans simply from repeated flexings.

One advantage of the hip joint hereinafter described is that it affords the user greater flexibility of the leg, permitting freedom for walking plus movement between a position where the legs are slightly crossed to a position where the legs are spread. It also permits the wearer to tilt the torso forward.

Accordingly, a principal feature of the invention is the fact that it is a more compact joint having a wider range of movement than joints heretofore used.

SUMMARY OF THE INVENTION

The foregoing and other objects and advantages of the invention are achieved through the use of three serially-connected truncated spherical sections which rotate relative to each other and relative to the adjoining sections of a hard space suit through ball bearings. The sections are equi-angular to prevent lockup when planar motions of the joint are desired by the wearer. The axes of rotation of the bearings are arranged so as to provide a minimum joint envelope. To conserve space in the axillary areas, the races of the ball bearings are nested as compactly as possible and in the preferred shoulder joint a pair of bearings is even overlapped.

IN THE DRAWINGS

FIG. 1 is a schematic view of a portion of a space suit in which the present invention is employed.

FIG. 5 is an enlarged sectional view of a portion of one of the bearings of FIG. 3 and associated elements.

FIG. 6 is an enlarged sectional view of the bearings in the axillary area in the position of FIG. 3.

FIG. 7 is a midsectional view through a hip joint showing the sections in a position similar to FIG. 3.

FIG. 8 is an enlarged sectional view through one of the bearings of the structure of FIG. 7 showing adjacent elements.

FIG. 9 is an enlarged view of the bearings of FIG. 7 in the axillary area.

DESCRIPTION OF PREFERRED EMBODIMENT

Figure 2:
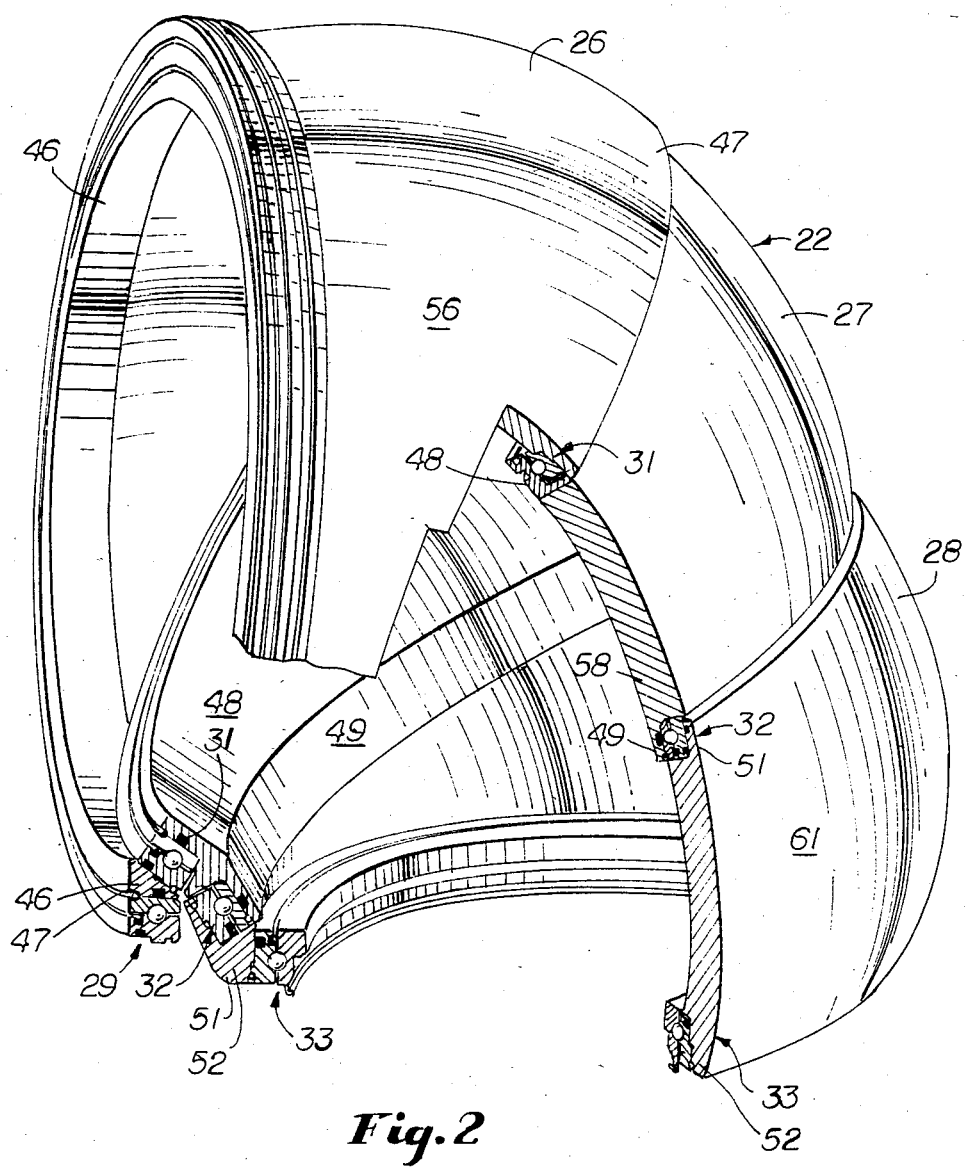
FIG. 2 is a perspective view thereof partially broken away to reveal internal structure.

FIG. 1 shows schematically a portion of a space suit 21. Shoulder joint 22, which, with the addition of the hip joint not shown in FIG. 1, comprises the present invention, is interposed between the torso 23 and the elbow 24 of the space suit. Shoulder joint 22, in the preferred embodiment, comprises, proceeding outwardly from torso 23, a first section 26, a second section 27 and a third section 28. Bearing 29 (FIGS. 2 and 3) is interposed between torso 23 and section 26, bearing 31 between sections 26 and 27, bearing 32 between sections 27 and 28, and bearing 33 between section 28 and elbow 24.

The races of the various bearings 29–33 are modified from conventional ball bearings, each consisting of an outer race 36, an inner race 37 and balls 38 interposed therebetween. One of the races of each bearing is formed with a groove to receive an elastomeric wiper seal 39 which engages the opposite race and forms a hermetic seal therewith. Furthermore, each race is sealed to a surrounding portion of one of the sections 26–28 by means of an elastomeric seal 41 fitting in grooves in the facing surfaces, or other convenient means. Assembly of the bearings to their surrounding sections 26–28 may be facilitated by forming matching grooves in the facing surfaces and inserting in the grooves via a slot (not shown) a cable or wire 42 which holds the parts together. By means not shown, the cables may be inserted and removed as required. One such means is shown in co-pending application Ser. No. 642,602, filed Aug. 20, 1984, and entitled, "Shoulder and Hip Joints for Hard Space Suits and the Like."

Figure 3:
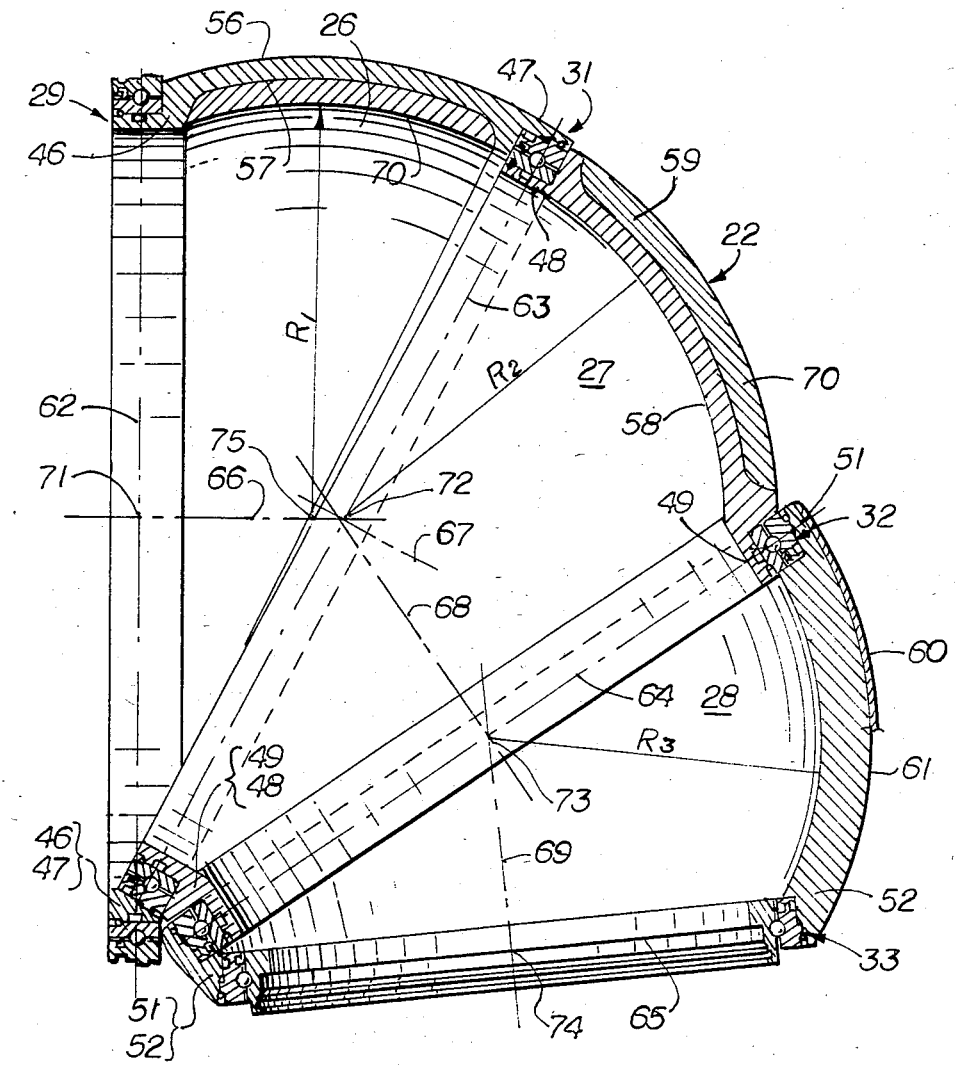
FIG. 3 is a midsectional view through a shoulder joint showing the sections arranged for maximum bending at the joint.

In the arrangement best shown in FIG. 3, the proximal end of section 26 is formed with an internal collar 46 which engages the inner race of bearing 29. The distal end of section 26 is formed with an external collar 47 which engages the outer race of bearing 31. At their widest separation (as shown at the top of FIG. 3), the collars 46 and 47 are spaced apart but at the narrowest part of section 26 (at the bottom of FIG. 3) the collars 46 and 47 coincide and are of an irregular shape.

The proximal end of section 27 is formed with an internal collar 48 which engages the inner race of bearing 31, while the distal end of section 27 is formed with an internal collar 49 which engages the inner race of bearing 32. At their widest separation (as shown near the top of FIG. 3) the collars 48 and 49 are spaced. At their narrowest point (at the bottom of FIG. 3) the collars 48 and 49 are of an irregular shape interposed between the bearings 31 and 32.

The proximal end of section 28 is formed with an external collar 51 which engages the outer race of bearing 32. The distal end of section 28 is formed with an external collar 52 which engages the outer race of bearing 33. At their narrowest point (the bottom of FIG. 3) collars 51 and 52 coincide and are of irregular shape.

Forming the collars 48, 49 to engage the inner races of bearings 31 and 32 while forming the collars of sections 26 and 28 to engage the outer races of bearing 31 and 32 permits stacking the bearings as shown in FIG. 3, wherein the bearing 31 is partially within the confines of the bearing 29. As has been stated, bulk in the axillary area is to be avoided in order to permit the shoulder joint to fit wearers of small size. Stacking the bearings as best shown in FIG. 6 materially reduces the axilla space occupied and permits the arm of the wearer to drop to the side of the wearer. In the hip joint depicted in FIGS. 7–9, the bearings are arranged end-to-end rather than overlapped to minimize the space occupied in the wearer's crotch.

In the preferred embodiment shown, each of the sections 26–28 is a truncated portion of a sphere. In situations where it is desired to avoid the effects of radiation, such as solar radiation, the sections may be made of metal and outer spherical surfaces of the section may be polished to enhance radiation reflection. Alternatively, the spherical surfaces may be coated with a reflective substance 60.

It has been opined that radiation is the most serious physical danger that man will encounter while traveling in space. The primary space radiation hazards are solar flares, galactic heavy ions (high-Z cosmic rays), and the South Atlantic anomaly in LEO trapped radiation. The major hazard is the solar flare radiation. The potential dose in an unshielded environment is in the several hundreds of rads, which can cause severe bone marrow depletion leading to tissue bleeding and possibly death in 20 to 40 days after exposure. When radiation shielding is desired, sections 22, 26 and 28 may be fabricated from a material with suitable shielding properties. In addition or alternatively, a pocket may be formed in the wall of the section and filled with a shield. The pocket may be formed in the wall by etching, cutting, grinding or some other fabrication step. If a section begins as a casting, a pocket may be initially cast therein. The pocket may be on the interior or exterior of the section. FIG. 3 depicts an internal pocket 57 on section 26 and an external pocket 59 on section 27. The pockets are each filled with a shield 70. A pocket and a shield is not shown for section 28. As used herein the term "shield" also includes thermal insulators of either the reflective or bulk varieties. Shield 70 may be a laminate having one or more laminations to block space rediation plus one or more laminations to retard the flow of heat.

Figure 4:
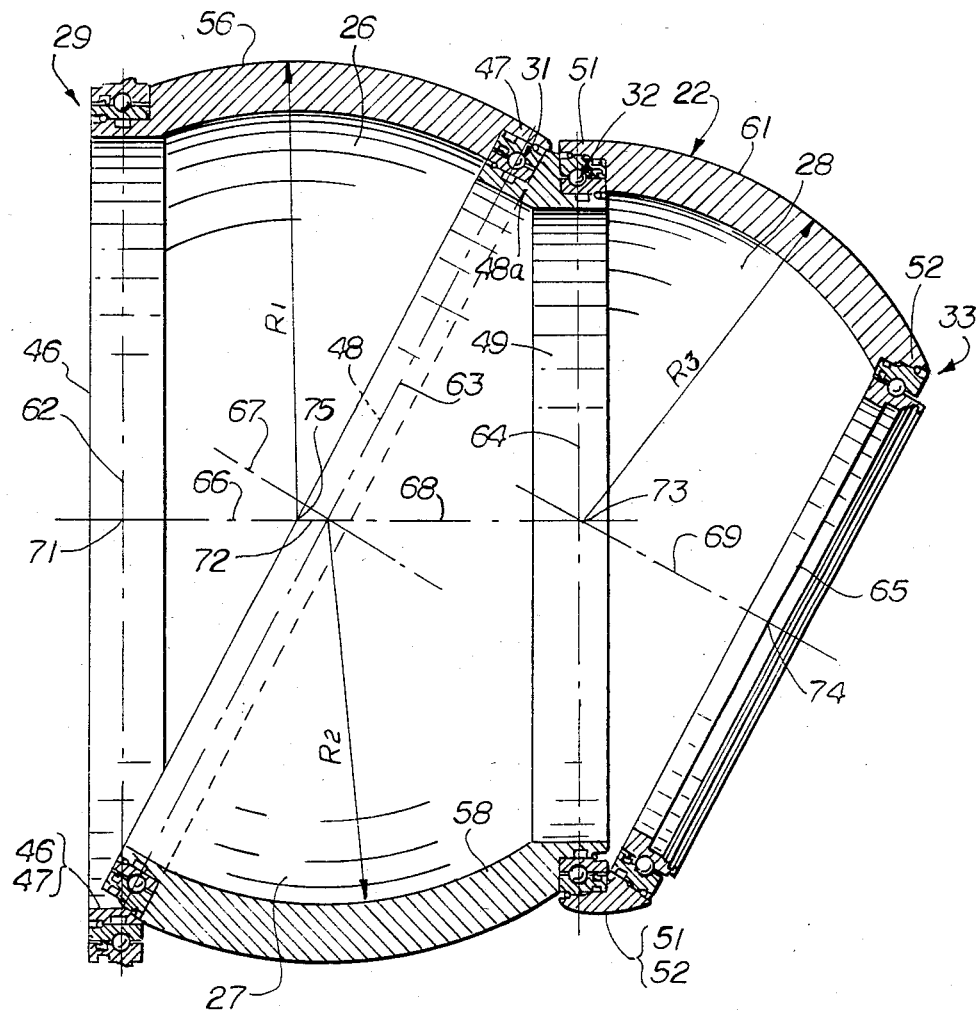
FIG. 4 is a view similar to FIG. 3 showing the sections in different relative positions to indicate relative movement therebetween.

Directing attention to FIGS. 3 and 4, which are mid-sections through the shoulder joint 22 the "mid-planes" of bearings 29, 31, 32 and 33, are indicated by reference numerals 62, 63, 64 and 65, respectively. These planes pass through the centers of the balls of the respective bearings. The axes of rotation of bearings 29, 31, 32 and 33, are indicated by reference numerals 66, 67, 68 and 69, respectively. The point of intersection of axis 66 with plane 62 is point 71, and the point of intersection of axis 69 with plane 65 is point 74. Axes 66, 67 and 68 intersect plane 63 at point 72 and axes 68 and 69 intersect plane 64 at point 73. Axes 66, 68 and 69 are planar for the particular orientation of sections 22, 26 and 28 shown in FIG. 3. The manner in which the axes of rotation intersect the mid-planes 63 and 64 results in the joint having a minimum envelope. That is, when the axes of rotation and mid-planes are so arranged the joint occupies a minimum volume for a selected interior diameter. Stated still another way, this arrangement of bearing centerlines and mid-planes results in optimally small bearing diameters for a chosen interior diameter or tunnel clearance.

The centers of rotation of the section spherical surfaces all reside on the bearing axes on or between points 71, 72, 73 and 74. As shown in FIG. 3, the center for spherical surface 56 of section 26 is point 75. The distance from surface to point 75 is radius $R_1$. The center for the inner spherical surface 58 of section 27 is point 72 and the distance between the point 72 and the surface is radius $R_2$. The spherical surface 61 of section 28 has a radius $R_3$ and a center 73.

When an arm is inserted within the shoulder joint 22 and the arm is moved, sections 26–28 rotate relative to each other, sections 26 and 28 rotate relative to their adjacent suit coverings, and bearing centerline 69 follows and approximately coincides with the longitudinal axis of the arm. FIG. 4 illustrates the shoulder joint of FIG. 3 wherein the mid-section 27 has been rotated 180 degrees relative to sections 26 and 28. FIGS. 3 and 4 merely depict two of the multifarious rotary positions that sections 26–28 may assume. It is apparent from the view of the joint in FIG. 4 that the included solid angle between the ends of each section are equal as the proximal end of section 26 is parallel to the distal end of section 27, and the proximal end of section 27 is parallel to the distal end of section. It has been discovered that when the included angles of the sections are equal the wearer's limb within the joint may be extended or flexed in a planar manner without joint lockup. Lockup is the condition where the wearer attempts to move a limb in a planar motion and the distal bearing axis of rotation wanders out of the plane. This wandering places undesirable shear forces on the limb and necessitates reprogramming of the joint for the bearing axis to return to the desired plane. In an aggravated situation the shear forces may cause an injury to the wearer.

In FIGS. 3 and 4 the shoulder joint is shown having three equal sections of 28 degrees each. This permits movement of the joint anywhere within the confines of a solid cone of 168 degrees. Other angles may be selected. The penalty for making the angles of the sections unequal will be lockup.

FIG. 7 illustrates a typical hip joint 76 comprising consecutive sections 77, 78 and 79, each of which is a section of a sphere, as in the shoulder joint 22. Bearing 81 connects the section 96 to the suit torso 23 (FIG. 1). Bearing 82 interconnects sections 77 and 78; bearing 83 interconnects sections 78 and 79 and bearing 84 connects section 79 with the next lowermost section of the suit, such as a thigh covering (not shown). The details of the bearings 81–84 are the same as in the shoulder joint 22. Further, the seals sealing the races to each other and to the surrounding portions of the sections 77–79 are the same as in the preceding embodiment. Removable cables 42, fitting into grooves in the abutting surfaces, function in the same manner as previously described and the joint has slots (not shown) for inserting and removing the cables similar to those on joint 22. The same reference numerals to designate the details of the bearings, the seals and the cables are used in FIGS. 7–9 as in FIGS. 2–6.

Section 77 has a proximal outer collar 86 engaging the outer race of bearing 81 and a distal inner collar 87 engaging the inner race of bearing 82. Section 78 has a proximal outer collar 88 engaging the outer race of bearing 82 and a distal inner collar 89 engaging the inner race of bearing 83. Section 79 has a proximal outer collar 91 engaging the outer race of bearing 83 and a distal outer collar 92 engaging the outer race of bearing 84. The collars 86 and 87 merge together in an irregularly shaped piece as shown in the left side of FIG. 7. Similarly, the collars 88 and 89 merge adjacent the same location as do the collars 91 and 92.

In the preferred embodiment of the invention, the sections 77–79 are spherical as indicated by outer surfaces 96, 97 and 98, respectively. It will be understood that pockets similar to pockets 57 and 59 may be formed in the walls of any one or more of the sections and they may be filled with shields.

When hip joint 76 is in use, the centerline 109 of bearing 84 approximately coincides with the longitudinal axis of the upper leg of the user. As the upper leg is moved, sections 77-79 are free to rotate relative to each other, section 77 is free to rotate relative to the torso section 23 (FIG. 1) of the suit, and section 79 is free to rotate relative to the upper leg covering of the suit. As depicted in FIG. 7, the leftmost ends of bearings 81-84 occupy the crotch of the joint user. The bearings are arranged end-to-end to minimize bulk. In the position shown in FIG. 7, the joint 76 is shown in the position it would assume if the wearer were standing upright with the left leg slightly crossed over the right leg. Joint 76 is shown having three equal sections of 23 degrees each. Accordingly, the joint has the capability of being moved anywhere within the confines of a solid cone of 138 degrees. Other angles may be selected. Inasmuch as the sections are equi-angular, the joint is not plagued by lockup.

Directing attention now to FIG. 7, the "mid-planes" (i.e., the plane through the centers of the balls of the bearings) of bearings 81, 82, 83 and 84 are, respectively, planes 101, 102, 103 and 104. The axes of rotation of bearings 81, 82, 83 and 84 are, respectively, axes 106, 107, 108 and 109. The intersection of axis 106 with plane 101 is point 111 and the intersection of axis 114 with plane 104 is point 114. Axes 107 and 108 intersect with mid-plane 102 at point 112 and axes 108 and 109 intersect with mid-plane 103 at point 113. As in the case of the shoulder joint 22, the arrangement of the bearing axes and the bearing mid-planes provides hip joint 76 with a minimum envelope. Following the pattern set by the shoulder joint, the centers of the spherical surfaces 96-98 are located on the bearing axes on or between points 111-114. Specifically, as shown in FIG. 7, surface 96 has a radius $R_4$ and a center at point 111, surface 97 has a center at point 112 and a radius $R_5$, and spherical section 98 has a radius $R_6$ and a center at point 113. As the sections 96-98 are arranged in FIG. 7, bearing axes 107-109 are contained in a plane.

What is claimed is:

1. A joint for a hard space suit comprising,
consecutive first, second and third hard sections, each said section having a proximal and a distal end, the ends of each said section being disposed at a solid geometric angle so that they converge,
a first bearing having a first axis of rotation and a first plane perpendicular to said first axis through the middle of said first bearing, said first axis intersecting said first plane at a first point, said first bearing being fixed to the proximal end of said first section,
a second bearing having a second axis of rotation and a second plane perpendicular to said second axis through the middle of said second bearing, said second axis intersecting said second plane at a second point, said second bearing being fixed both to the distal end of said first section and the proximal end of said second section,
a third bearing having a third axis of rotation and a third plane perpendicular to said third axis through the middle of said third bearing, said third axis intersecting said third plane at a third point, said third bearing being fixed both to the distal end of said second section and the proximal end of said third section,
a fourth bearing having a fourth axis of rotation and a fourth plane perpendicular to said fourth axis through the middle of said fourth bearing, said fourth axis intersecting said fourth plane at a fourth point, said fourth bearing being fixed to the distal end of said fourth section,
the axes of rotation of at least three said bearings intersecting the said plane of an adjacent bearing at the same point at which the axis of rotation of that adjacent bearing intersects its said plane, whereby the interiors of said sections provide a minimal envelope for a human shoulder or hip.

2. A joint according to claim 1 in which said first axis intersects said second plane at said second joint and said fourth axis intersects said third plane at said third point.

3. A joint according to claim 1 in which said first, second, third and fourth joints lie on said common plane when said joint is fully compressed.

4. A joint according to claim 1 in which the interior of each said section is a truncated sphere.

5. A joint according to claim 1 in which the exterior of each said section is a truncated sphere.

6. A joint according to claim 1 in which at least a portion of the interior of at least one said section is formed with an internal pocket and padding in said pocket.

7. A joint according to claim 1 in which at least a portion of the exterior of at least one said section is formed with an external pocket and padding in said pocket.

8. A joint according to claim 1 in which said first section is formed where said proximal and distal ends of said first section converge in a common mass fixed to portions of both said first and second bearings.

9. A joint according to claim 1 in which said second section is formed where said proximal and distal ends of said second section converge in a common mass fixed to portions of both said second and third bearings.

10. A joint according to claim 9 in which said second and third bearings each have inner and outer races, said common mass being fixed to the inner races of said second and third bearings.

11. A joint according to claim 1 in which said third section is formed where said proximal and distal ends of said third section converge in a common mass fixed to portions of both said third and fourth bearings.

12. A joint according to claim 10 in which said third and fourth bearings each have inner and outer races, said common mass being fixed to the outer races of said third and fourth bearings.

13. A joint according to claim 1 in which said third bearing is larger than said fourth bearing, said second bearing is larger than said third bearing and said first bearing is larger than said second bearing.

14. A joint according to claim 1 in which in the area where the proximal and distal ends of said first section converge, said second bearing is disposed inside said first bearing.

15. A joint according to claim 1 in which in the area where the proximal and distal ends of said first section converge, said second bearing is disposed inside said first bearing.

16. A joint comprising at least two rigid truncated spherical consecutive sections, each section having proximal and distal ends which converge, a first rotatable bearing fixed to the proximal end of said first section, a second rotatable bearing fixed to the distal end of said second section, a third rotatable bearing having inner and outer races, said outer race being fixed to the distal end of said first section and said inner race being fixed to the proximal end of said second section, a portion of said third bearing being inside said first bearing in the region where the proximal and distal ends of said first section converge, and said bearings each having an axis of rotation, said axes for said first and second bearings intersecting on the axis of rotation of said third bearing at a point on an imaginary mid-plane of said third bearing.

17. A joint for a hard space suit to be interposed between first and second space suit members disposed at opposite ends of said joint, said joint comprising consecutive first, second and third hard sections, each said section having a proximal and a distal end, the ends of each section converging at an angle, said convergence angles being substantially equal, a first circular bearing fixed to said first suit member and the proximal end of said first section, a second circular bearing fixed to the distal end of said first section and the proximal end of said second section, a third circular bearing fixed to the distal end of said second section and the proximal end of said third section, and a fourth circular bearing fixed to the distal end of said fourth section and said second suit member, each of said sections having unlimited rotational freedom, in clockwise or counterclockwise direction, with respect to its adjacent section, whereby when a limb is inserted out of said suit member, through said first, second and third sections and into said second suit member, said limb may be extended linearly and moved without joint lockup anywhere within the confines of a solid cone having its apex on the axis of rotation of said first bearing.

18. A joint according to claim 17 in which the interior of each said section is a truncated sphere.

19. A joint according to claim 18 in which each said exterior is formed with a highly reflective exterior surface.

20. A joint according to claim 17 in which the exterior of each said section is a truncated sphere.

21. A joint according to claim 17 in which said first section is formed where said proximal and distal ends of said first section converge in a common mass fixed to portions of both said first and second bearings.

22. A joint according to claim 17 in which said second section is formed where said proximal and distal ends of said second section converge in a common mass fixed to portions of both said second and third bearings.

23. A joint according to claim 22 in which said second and third bearings each have inner and outer races, said common mass being being fixed to the inner races of said second and third bearings.

24. A joint according to claim 17 in which said third section is formed where said proximal and distal ends of said third section converge in a common mass fixed to portions of both said third and fourth bearings.

25. A joint according to claim 24 in which said third and fourth bearings each have inner and outer races, said common mass being fixed to the outer races of said third and fourth bearings.

26. A joint according to claim 17 in which said third bearing is larger than said fourth bearing, said second bearing is larger than said third bearing and said first bearing is larger than said second bearing.

* * * * *